(12) United States Patent
Hwang (10) Patent No.: US 9,230,603 B2
(45) Date of Patent: *Jan. 5, 2016

(54) DISPLAY DEVICE FOR HAVING A FUNCTION OF SEARCHING A DIVIDED SCREEN, AND THE METHOD FOR CONTROLLING THE SAME

(75) Inventor: Do Chung Hwang, Gumi-si (KR)

(73) Assignee: LG Electronics Inc., Seoul (KR)

( * ) Notice: Subject to any disclaimer, the term of this patent is extended or adjusted under 35 U.S.C. 154(b) by 1292 days.

This patent is subject to a terminal disclaimer.

(21) Appl. No.: 12/444,990

(22) PCT Filed: Oct. 10, 2007

(86) PCT No.: PCT/KR2007/004943
§ 371 (c)(1),
(2), (4) Date: Jan. 13, 2010

(87) PCT Pub. No.: WO2008/044872
PCT Pub. Date: Apr. 17, 2008

(65) Prior Publication Data
US 2010/0119207 A1   May 13, 2010

(30) Foreign Application Priority Data
Oct. 10, 2006   (KR) .................. 10-2006-0098488

(51) Int. Cl.
*H04N 5/775* (2006.01)
*G11B 27/10* (2006.01)
(Continued)

(52) U.S. Cl.
CPC .............. *G11B 27/10* (2013.01); *G11B 27/105* (2013.01); *H04N 5/44591* (2013.01); *H04N 5/76* (2013.01);
(Continued)

(58) Field of Classification Search
CPC ..... H04N 9/8042; H04N 5/85; H04N 1/2112; G11B 2220/90; G11B 27/105
See application file for complete search history.

(56) References Cited

U.S. PATENT DOCUMENTS 5,956,094 A * 9/1999 Chun ........................... 348/564
2001/0014203 A1* 8/2001 Ito et al. ......................... 386/67
(Continued)

FOREIGN PATENT DOCUMENTS

CN   1547848 A   11/2004
EP   0 838 766   4/1998
(Continued)

OTHER PUBLICATIONS

PCT International Search Report dated Jul. 7, 2009.
(Continued)

*Primary Examiner* — William C Vaughn, Jr.
*Assistant Examiner* — Daniel Tekle
(74) *Attorney, Agent, or Firm* — KED & Associates LLP (57) ABSTRACT

Disclosed herein are a video apparatus including a screen-division searching function and a method of controlling the same, which are capable of solving problems caused in a process of reproducing and checking a recorded broadcasting program at a high speed. The method of controlling the video apparatus includes selecting specific video data stored in a memory, and dividing a full screen into a plurality of partial screens, dividing the selected specific video data into a plurality of portions, and respectively displaying the portions of the selected specific video data on the plurality of partial screens. Accordingly, it is possible check the whole contents of a specific broadcasting to—accurately program or a material recorded by a closed circuit television (CCTV) camera at a high speed.

11 Claims, 6 Drawing Sheets (51) Int. Cl.

| | | |
|---|---|---|
| *H04N 5/445* | (2011.01) | |
| *H04N 5/76* | (2006.01) | |
| *H04N 5/783* | (2006.01) | |
| *H04N 7/18* | (2006.01) | |
| *H04N 9/79* | (2006.01) | |
| *H04N 21/4223* | (2011.01) | |
| *H04N 21/431* | (2011.01) | |
| *H04N 21/4402* | (2011.01) | |
| *H04N 21/485* | (2011.01) | |
| *H04N 21/845* | (2011.01) | |
| *H04N 9/82* | (2006.01) | |
| *H04N 21/4147* | (2011.01) | |

(52) U.S. Cl.
 CPC ............... *H04N 5/783* (2013.01); *H04N 7/18* (2013.01); *H04N 9/79* (2013.01); *H04N 21/4223* (2013.01); *H04N 21/4316* (2013.01); *H04N 21/440263* (2013.01); *H04N 21/485* (2013.01); *H04N 21/8456* (2013.01); *H04N 9/8205* (2013.01); *H04N 21/4147* (2013.01)

(56) References Cited

U.S. PATENT DOCUMENTS

| | | |
|---|---|---|
| 2003/0033502 A1 | 2/2003 | Matsuzaki |
| 2003/0108330 A1* | 6/2003 | Jo .................................... 386/70 |
| 2003/0156824 A1* | 8/2003 | Lu .................................... 386/68 |
| 2005/0089303 A1* | 4/2005 | Kim et al. ........................ 386/46 |
| 2006/0044216 A1* | 3/2006 | Love ............................... 345/1.3 |
| 2006/0072003 A1* | 4/2006 | Kawase ...................... 348/14.01 |
| 2009/0222730 A1* | 9/2009 | Wixson et al. ................ 715/723 |

FOREIGN PATENT DOCUMENTS

| | | |
|---|---|---|
| EP | 1 515 552 | 3/2005 |
| JP | 10-187760 | 7/1998 |
| JP | 2000-209541 | 7/2000 |
| JP | 2004-072132 | 3/2004 |
| JP | 2006-121399 | 5/2006 |
| JP | 2006-186617 | 7/2006 |

OTHER PUBLICATIONS

European Search Report dated Feb. 3, 2010.

Korean Notice of Allowance dated Apr. 15, 2013 for Application 10-2006-0098488 and English translation.

Chinese Office Action dated Apr. 16, 2014 in Application No. 20078004437.0.

* cited by examiner

| | page 1/2 | ☑ non-selection | | |
|---|---|---|---|---|
| list of recorded materials | ☐ F01F01 4/4(THU) | TV 7-0 PM 3:10 ~ AM 12:00 | | F01F02 2/2(SAT) |
| | ☐ F01F03 5/5(SUN) | reproduction | | F01F04 1/1(TUE) |
| My TV | ☐ F01F05 3/3(SUN) | screen-division searching ⊙ all select | | F01F06 6/6(THU) |
| def-aaaaa... ghi-aaaaa... | ☐ F01F07 7/7(SUN) | move delete | | F01F08 8/8(THU) |
| lmn-aaaaa... opq-aaaaa... | ☐ F01F09 9/9(MON) | dvhs store change title | | F01F10 10/10(THU) |
| rst-aaaaa... | ☐ F01F11 11/11(MON) | close | | F01F12 12/12(THU) |

FIG. 6A

| Setting of screen-division searching |
|---|
| [Q] Number of divided screens?  four ▼ / nine / ⋮ / user option |
| close                                        search |

FIG. 6B

| Setting of screen-division searching |
|---|
| [Q] Set reproduction portions of divided video data   division ▼ / ⋮ / user option |
| close                                        search |

FIG. 6C

| Setting of screen-division searching |
|---|
| [Q] Set reproduction speeds of divided video data   same accelerated speed ▼ / ⋮ / user option |
| close                                        search |

FIG. 7

DISPLAY DEVICE FOR HAVING A FUNCTION OF SEARCHING A DIVIDED SCREEN, AND THE METHOD FOR CONTROLLING THE SAME

TECHNICAL FIELD

The present invention relates to a video apparatus, and more particularly to a video apparatus including a screen-division searching function and a method of controlling the same.

BACKGROUND ART

Video apparatuses such as television (TV) receivers have included a variety of functions with the development thereof.

In particular, recently, a TV receiver including a digital video recording (DVR) function or a personal video recording (PVR) function has appeared.

Since a video apparatus including the DVR function or the PVR function includes a small or large hard disk driver (HDD); it is possible to store a significantly greater amount of data compared with the prior art.

Conventionally, as a method of searching or checking contents of a variety of video data stored in the video apparatus, there is a method of allowing a user to select specific video data and displaying the specific video data on a full screen.

Since any video apparatus includes an accelerated searching function, specific video data can be reproduced at an accelerated speed, for example, a two-time speed or a four-time speed.

However, a conventional video apparatus including a function for searching specific video data and a method of the controlling the same have the following problems.

First, conventionally, since any video data is displayed and searched on a full screen, it takes much time for a user to search for a specific scene.

Second, conventionally, although there is an accelerated searching function for searching any video data, an image cutting phenomenon may occur if the reproduction speed is too high. Thus, a specific scene desired by a user may not be displayed.

For example, in video data photographed by a closed-circuit television (CCTV) camera, since similar backgrounds and still cuts are continuously repeated, a function for rapidly and accurately searching for a scene desired by a user is further required.

Recently, since the video apparatus including the DVR function or the PVR function can store a greater amount of video data, specific video data is included in the greater amount of video data and thus a function for rapidly and accurately searching for a scene desired by a user is further required.

DISCLOSURE OF INVENTION

Accordingly, the present invention is directed to a video apparatus including a screen-division searching function and a method of controlling the same that substantially obviate one or more problems due to limitations and disadvantages of the related art.

An object of the present invention devised to solve the problem lies on a video apparatus including a screen-division searching function for searching for a specific scene desired by a user as fast as possible in a process of searching any video data, and a method of controlling the same.

Another object of the present invention devised to solve the problem lies on a video apparatus including a screen-division searching function, which is capable of solving a problem that any scene is not displayed in a process of searching any video data, due to an excessively high reproduction speed, and a method of controlling the same.

The object of the present invention can be achieved by providing a method of controlling a video apparatus including a screen-division searching function, the method including: selecting specific video data stored in a memory; and dividing a full screen into a plurality of partial screens, dividing the selected specific video data into a plurality of portions, and respectively displaying the plurality of portions of the selected specific video data on the plurality of partial screens.

The number of the plurality of partial screens may be set by a user.

Different reproduction portions of the selected video data may be set and different images may be respectively displayed on the plurality of partial screens.

Fast searching screens may be displayed on the plurality of partial screens.

Searching speeds of the accelerated searching screens may be set by a user.

The specific video data may be video data photographed by a closed circuit television (CCTV) camera or the specific video data may be digital broadcasting program data.

The digital broadcasting program data may include information on reproduction portions and the number of sections, and the number of the plurality of partial screens and the reproduction portions may be automatically set with reference to the information.

A displayed image of video data of each of the reproduction portions and a display degree thereof may be displayed on the plurality of partial screens. At this time, the display degree may be the amount of data or time.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

Hereinafter, preferred embodiments of the present invention for realizing the above-described objects will be described with reference to the accompanying drawings.

Figure 1:
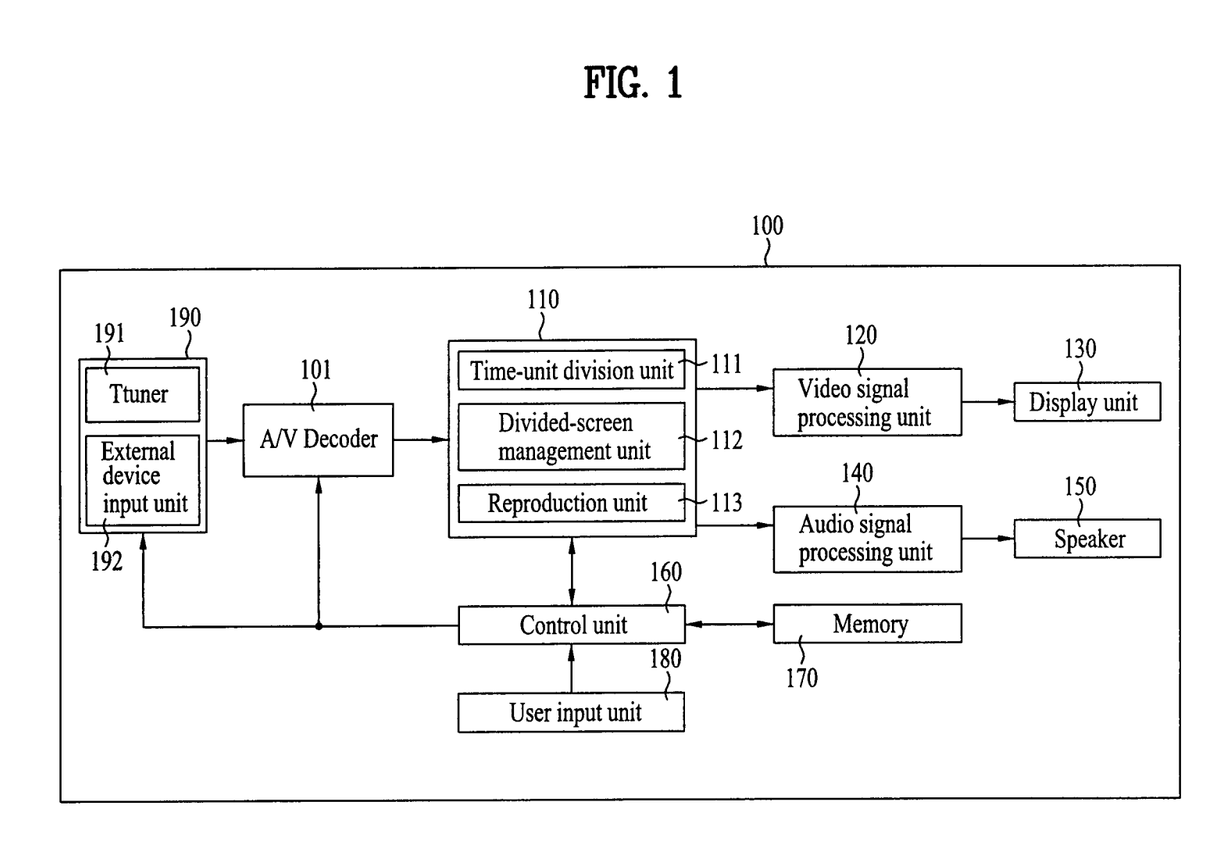
FIG. 1 is a block diagram showing an example of the configuration of a video apparatus including a screen-division searching function according to the present invention.

FIG. 1 is a block diagram showing an example of the configuration of a video apparatus including a screen-division searching function according to the present invention.

Referring to FIG. 1, the configuration of the video apparatus including the screen-division searching function according to the present invention will now be described.

The screen-division searching function is first suggested in the present invention and will be understood by those skilled in the art through the below description.

As shown in FIG. 1, the video apparatus 100 according to the present invention includes an A/V decoder 101, a search control unit 110, a video signal processing unit 120, a display unit 130, an audio signal processing unit 140, a speaker 150, a main control unit 160, a memory 170, a user input unit 180, and a reception unit 190.

Only components which are directly or indirectly related to the present invention are shown in FIG. 1 and components related to general functions for receiving and processing a broadcasting signal will be omitted.

However, the video apparatus including the screen-division searching function according to the present invention can be embodied by those skilled in the art with reference to FIGS. 1 to 7.

Examples of the video apparatus 100 may include a television receiver, a personal computer (PC), a notebook computer, and a digital multimedia broadcasting (DMB) mobile phone.

The reception unit 190 may include a tuner 191 and an external device input unit 192. The tuner 191 receives a broadcasting signal and the external device input unit 192 receives data outputted from a DVD player, a-PC or a universal serial bus (USB) memory card.

The A/V decoder 101 decodes data received by the reception unit 190.

The search control unit 110 determines how many portions one piece of video data is divided into, in a process of reproducing specific video data stored in the memory 170.

That is, when specific video data stored in the memory 170 is selected by the main control unit 160, the search control unit 110 divides a full screen into a plurality of partial screens, divides the selected specific video data into a plurality of portions, and respectively displays the plurality of portions of the selected specific video data on the plurality of partial screens.

More particularly, the search control unit 110 includes a time-unit division unit 111, a divided-screen management unit 112 and a reproduction unit 113.

The time-unit division unit 111 determines how many portions one piece of video data is divided into and in which ranges the portions are set.

The divided-screen management unit 112 determines how many partial screens the screen for displaying one piece of video data is divided into.

The reproduction unit 113 simultaneously reproduces divided screens.

According to the present invention, a user can set the number of the plurality of partial screens by the detailed configuration of the search control unit 110. Different reproduction portions of the selected video data are set and different images are respectively displayed on the plurality of partial screens. Fast searching screens are displayed on the plurality of partial screens. At this time, the searching speeds of the fast searching screens can be set by a user.

The video signal processing unit 120 processes a signal such that the video data divided by the search control unit 110 can be outputted via the display unit 130.

The audio signal processing unit 140 processes a signal such that audio data can be outputted via the speaker 150.

The main control unit 160 controls the A/V decoder 101 and the search control unit 110 and can be embodied by, for example, a central processing unit (CPU) or a microcomputer.

The user input unit 180 allows the user to select specific video data from plural pieces of video data and receives a signal for setting a screen division method.

The user input unit 180 can be embodied by, for example, a remote controller or a local key button attached to the video apparatus 100.

The memory 170 stores a variety of video data. The memory 170 may store video data, audio data or other data.

The memory 170 may include recording mediums with a variety of capacities, such as a hard disk drive (HDD), a CD-ROM and a DVD.

Meanwhile, the present invention may be embodied by hardware, software or programming, as shown in FIG. 1.

A process of setting and performing the screen-division searching function according to the present invention will now be described in detail with reference to FIGS. 2 to 7.

Figure 2:
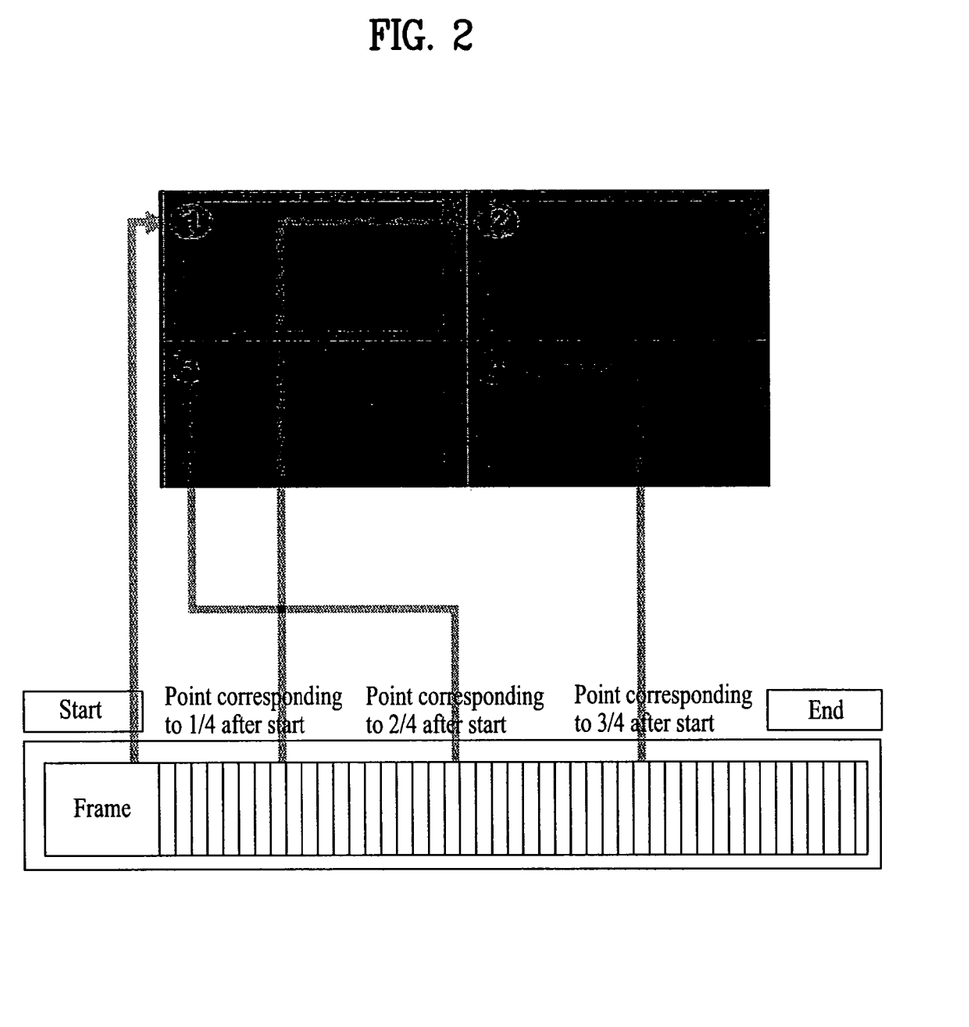
FIG. 2 is a view showing divided screens according to a first embodiment of the present invention.

FIG. 2 is a view showing divided screens according to a first embodiment of the present invention.

Hereinafter, a process of dividing and simultaneously outputting frames configuring specific video data on a screen will be described with reference to FIG. 2.

As shown in a lower part of FIG. 2, one piece of video data includes numerous frames. An image may be moved softly or roughly according to a frame passage speed. In general, an image such as animation, movie or a TV broadcasting program includes 18 to 30 frames per second. Video data of several hours is made by such frames.

The screen-division searching function according to the present invention divides any video data into a plurality of portions and simultaneously displays the plurality of portions a screen, as shown in an upper part of FIG. 2. The screen-division searching function is characterized in that divided portions of the video data are respectively reproduced on the divided screens.

Instead of one piece of video data, at least two pieces of video data may be divided into a plurality of portions and the divided portions may be simultaneously displayed on a screen.

For example, in order to display a recorded material photographed by a CCTV camera, the screen of the video apparatus is quadrisected into four equal screens as shown in FIG. 2. The quadrisection is only exemplary and the other dividing numbers are possible within the technical spirit of the present invention.

The recorded material reproduced on the divided screens is quadrisected into four equal portions with reference to the total time (or the total capacity) of the recorded material.

For example, in the screen shown in the upper part of FIG. 2, a first screen starts to output the recorded material at an initial point of the recorded material, a second screen starts to output the recorded material at a point which corresponds to ¼ of the recorded material, a third screen starts to output the recorded material at a point which corresponds to 2/4 of the recorded material, and a fourth screen starts to output the recorded material at a point which corresponds to ¾ of the recorded material.

According to the present invention, it is possible to decrease the time for checking the contents of the recorded material by at least four times of the time required in the prior art.

Although the recorded material reproduced on the divided screens is accurately quadrisected into four equal portions, the recorded material may not be divided into equal portions. The lengths of the reproduction portions may be variously designed such that a reproduction end time point may vary according to the divided screens.

The output speeds of the divided screens may be accelerated speeds (one-time speed, two-time speed, three-time speed, four-time speed or the like) supported by the existing video apparatus. The output speed may be vary according to the divided screens and may be equal in all the divided screens.

The lower part of FIG. 2 shows image output points of any video data. For example, if any video data is movie of three hours, the frames shown in the lower part of FIG. 2 become frames of three hours.

Arrows connected from the lower part to the upper part of FIG. 2 indicate start points of images which will be displayed on the divided screens of the video apparatus such as a TV receiver.

If the video apparatus is embodied by such a method, the image of one piece of video data is quadrisected to four equal portions and the divided portions are simultaneously displayed. Accordingly, since the recorded material is displayed on the divided screens with time differences, a recorded image can be checked at a speed which is four times of that of the prior art.

In particular, the screen-division searching function is available in a recorded image in which a specific scene appears while similar scenes are continuously displayed. A representative example is an image photographed by the CCTV camera.

The screen-division searching function is available when a specific point of movie which was watched in the past is searched at a high speed or when a specific point of an educational image for displaying lessons while writing on a board is searched.

Meanwhile, the screen-division searching function may be set as a default value such that the screen-division searching function is always performed when any video data is reproduced.

Since the screen-division searching function is particularly advantageous to video data photographed by the CCTV camera, it is preferable that the screen-division searching function is automatically performed only when the video data photographed by the CCTV camera is reproduced.

In a digital broadcasting program, a transport stream including information on at least one section included in one broadcasting program is transmitted.

For example, in a news broadcasting program, information on a political section, an economic section, a cultural section and a sport section may be included.

Alternatively, in an EBS broadcasting program, the transport stream may be divided into a first problem, a second problem, a third problem and so on or may be divided into a mathematical section, an English section, a Korean section and so on.

If the digital broadcasting program including information on divided sections is recorded and reproduced, the screen-division searching function according to the present invention can divide a screen according to the number of sections and set reproduction portions of the divided screens according to the sections, without the designation by the user.

Accordingly, the user can conveniently and simultaneously view a variety of information and can easily search for a desired scene.

Figure 3:
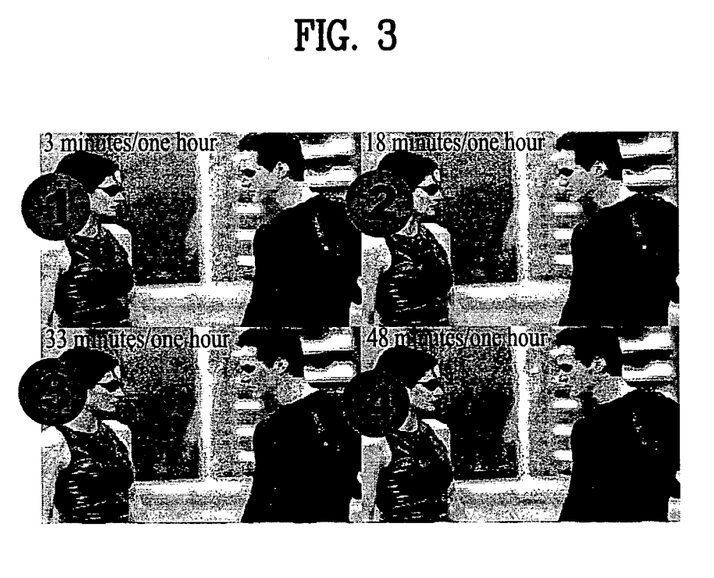
FIG. 3 is a view showing divided screens according to a second embodiment of the present invention.

FIG. 3 is a view showing divided screens according to a second embodiment of the present invention.

Figure 4:
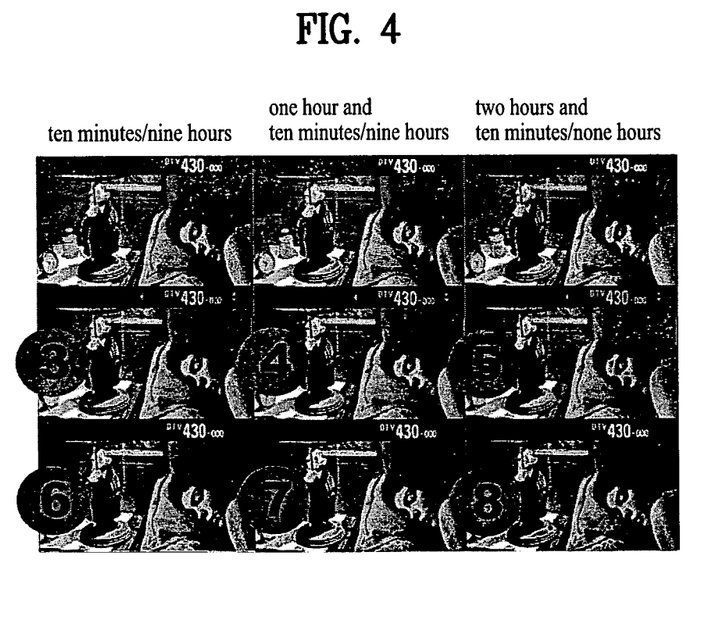
FIG. 4 is a view showing divided screens according to a third embodiment of the present invention.

FIG. 4 is a view showing divided screens according to a third embodiment of the present invention.

Hereinafter, a method of displaying degrees of reproducing the images on the divided screens will be described with reference to FIGS. 3 and 4.

The user wants to check how many degrees of the images are reproduced on the divided screens.

For example, information on where the time points or the degrees in which the images are displayed on the divided screens are positioned in the total image of the video data is displayed on the upper sides of the divided screens. Instead of the upper sides of the divided screens, the degrees of the displaying the images on the divided screens can be displayed on the other regions.

For example, if the video data shown in FIG. 3 is video data of one hour and is quadrisected as shown in FIG. 3 and three minutes have passed from an initial reproduction time point, the first screen displays a point where three minutes have elapsed, the second screen displays a point where 18 minutes have elapsed, the third screen displays a point where 33 minutes have elapsed, and the fourth screen displays a point where 48 minutes have elapsed, in the total amount of time.

Alternatively, if the video data output in FIG. 4 is video data of nine hours and is divided into nine portions as shown in FIG. 4 and ten minutes have elapsed from an initial reproduction time point, the first screen displays a point where ten minutes have elapsed, the second screen displays a point where one hour and ten minutes have elapsed, and the third screen displays a point where two hours and ten minutes have elapsed, in the total amount of time. Accordingly, it is possible to increase convenience of the user by displaying the degree of reproducing the images on the divided screens.

Although, in FIGS. 3 and 4, the time is equally divided by the number of the divided screens, the user may set the time differences which are not constant, set the total size to be divided in the unit of frames or in the unit of bytes, or select how many partial screens the full screen is divided into.

Figure 5:
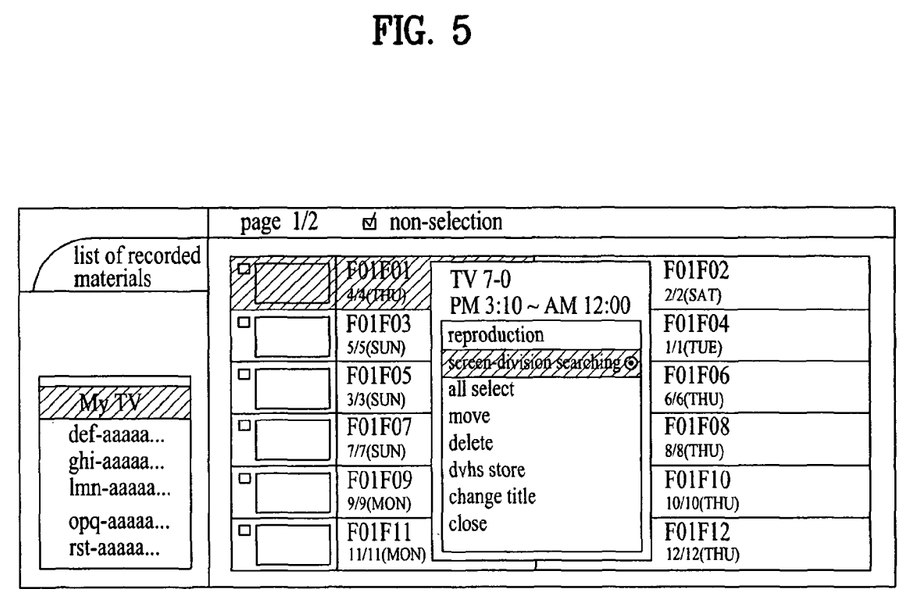
FIG. 5 is a view showing an example of a menu screen for starting the screen-division searching function according to the present invention.

FIG. 5 is a view showing an example of a menu screen for starting the screen-division searching function according to the present invention.

Hereinafter, a method of starting the screen-division searching function will be described with reference to FIG. 5.

As shown in FIG. 5, a menu for selecting the screen-division searching function is added to a menu of the video apparatus including a DVR function or a PVR function.

Figure 6A:
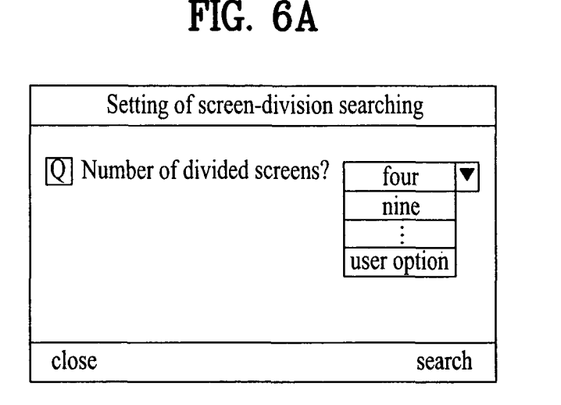
FIG. 6A is a view showing a first example of controlling a basic setting value of the screen-division searching function according to the present invention.
Figure 6B:
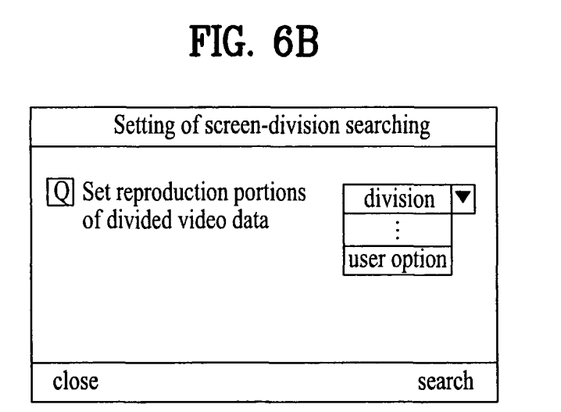
FIG. 6B is a view showing a second example of controlling a basic setting value of the screen-division searching function according to the present invention.
Figure 6C:
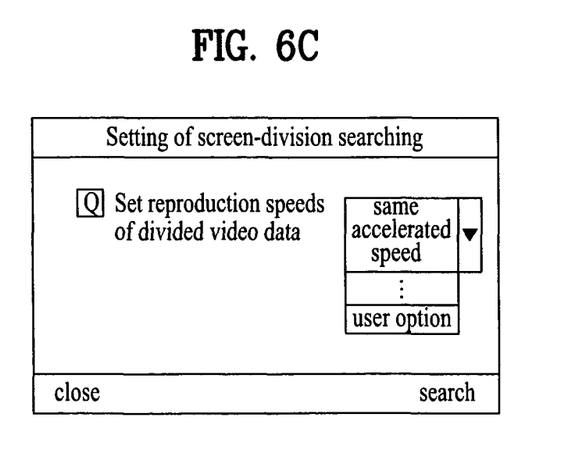
FIG. 6C is a view showing a third example of controlling a basic setting value of the screen-division searching function according to the present invention.

When the screen-division searching function is selected, the screen-division searching function may be performed according to a predetermined value or a lower-level menu screen shown in FIGS. 6A to 6C may be displayed.

FIG. 6A is a view showing a first example of controlling a basic setting value of the screen-division searching function according to the present invention.

FIG. 6B is a view showing a second example of controlling a basic setting value of the screen-division searching function according to the present invention.

FIG. 6C is a view showing a third example of controlling a basic setting value of the screen-division searching function according to the present invention.

Hereinafter, examples of controlling a lower-level menu of the screen-division searching function will be described with reference to FIGS. 6A to 6C.

If the user does not select the lower-level menu shown in FIGS. 6A to 6C, as the basic setting, a total reproduction time of one piece of video data (e.g., a recorded image or the like) is divided by the number (e.g., four or nine) of the divided screens and the video data is reproduced.

Accordingly, in the basic setting, the time differences between the divided screens are identical, the reproduction speeds of the video data on the divided screens are identical, and reproduction of the video data on the divided screens is finished at the same time.

However, for convenience of the user, the lower-level menus shown in FIGS. 6A to 6C are added so as to control a basic setting value which is a reference value for dividing and displaying specific video data on a screen.

Although the processes are shown in FIGS. 6A to 6C, these processes may be displayed on a single screen if necessary.

As shown in FIG. 6A, the user may arbitrarily select the number of the divided screens. Further, the user may directly specify the number of the divided screens.

As shown in FIG. 6B, the user may arbitrarily select the reproduction portions of the divided video data. For example, the video data may be divided into four portions or nine portions or may be divided in different ranges.

As shown in FIG. 6C, the reproduction speeds of the divided screens may be controlled. That is, the accelerated speeds of the divided screens are different from one another. In this case, the reproduction of the divided screens is finished at different time points.

Since the accelerated speeds of the divided screens are different from one another, the divided screen on which the divided video data is first reproduced may be in a stop state, may be in a black background state or may repeatedly reproduce the video data until the reproduction of the video data on the other divided screens is finished.

While the divided video data is reproduced, the divided screens are selected so as to control the accelerated speeds of the divided screens. The divided screens can be easily selected using the numerical keys of the remote controller.

Meanwhile, a total division-screen stopping function is added such that the screens are stopped whenever the user finds a desired scene during searching. After stopping, a fast forward function or a rewinding function may be further performed.

The above-described functions may be applied to all or a part of the divided screens.

A function for selecting a divided screen number displayed at the upper side of the divided screen using the numerical keys of the remote controller and changing the divided screen to the full screen when the user finds a desired scene during searching according to the screen-division searching function.

Figure 7:
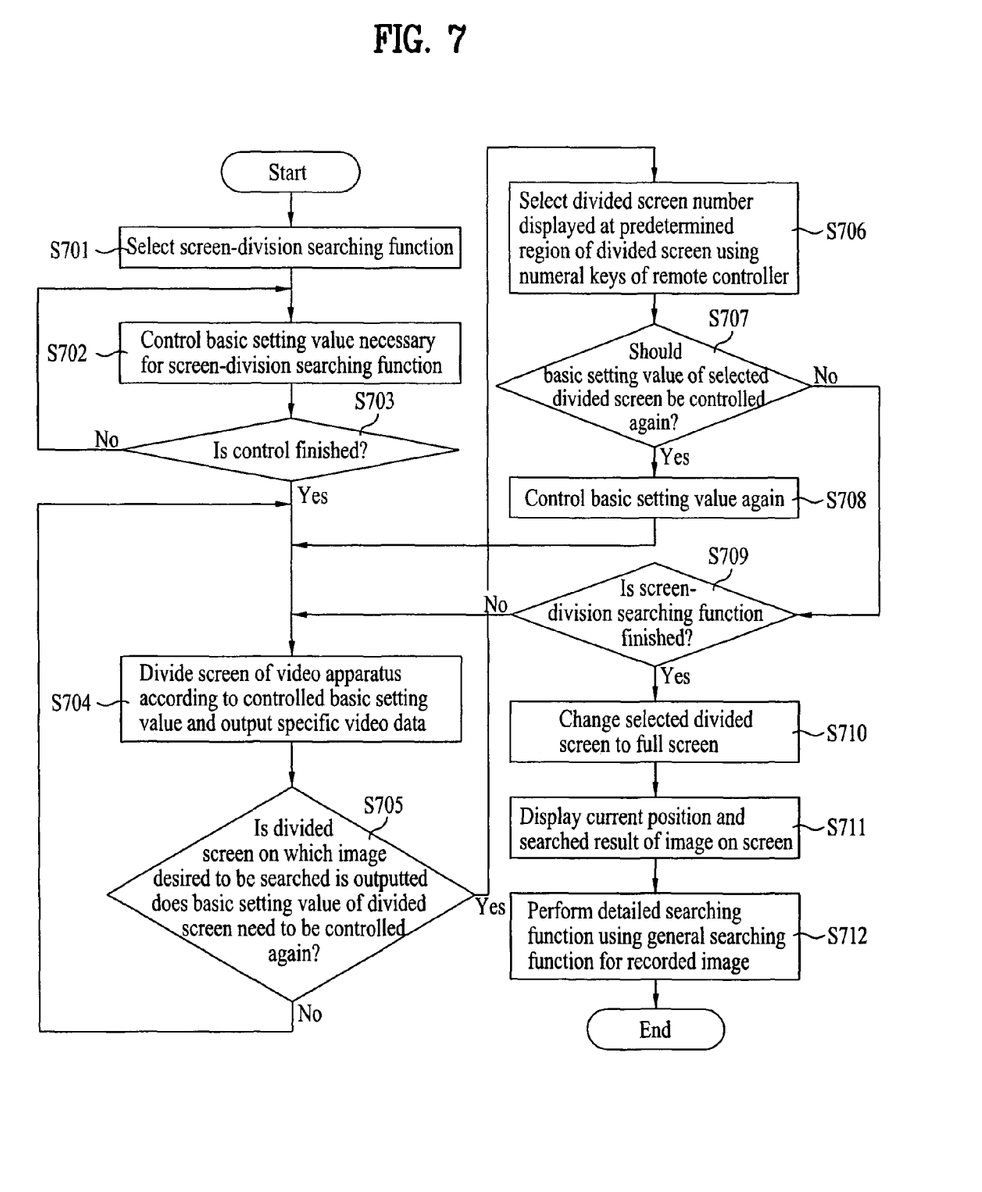
FIG. 7 is a flowchart illustrating a method of controlling the video apparatus including the screen-division searching function according to the present invention.

FIG. 7 is a flowchart illustrating a method of controlling the video apparatus including the screen-division searching function according to the present invention.

Hereinafter, the method of controlling the video apparatus including the screen-division searching function according to the present invention will be described with reference to FIG. 7.

The below-described controlling method arranges the contents described with respect to FIGS. 1 to 6C in time series and the detailed description thereof will be omitted.

However, the embodiments of the present invention can be easily understood by those skilled in the art through the contents described with respect to FIGS. 1 to 6C.

In the video apparatus according to the present invention, the screen-division searching function is selected through a menu (S701). For example, in the video data photographed by the CCTV camera, the video apparatus may be designed such that the screen-division searching function is automatically performed.

A basic setting value necessary for the screen-division searching function is controlled (S702). For example, the menus shown in FIGS. 6A to 6C are controlled. Alternatively, the screen-division searching function may be performed according to a basic default value, without controlling the basic setting value.

It is determined whether the control of the basic setting value is finished (S703). If it is determined that the control of the basic setting value is finished in the step S703, then the screen of the video apparatus is divided according to the controlled basic setting value and specific video data is outputted (S704).

The video apparatus may include, for example, a DVR function or a PVR function.

It is determined whether a divided screen for outputting an image or scene, which is desired to be searched, is found or whether the basic setting value of the divided screen needs to be controlled again (S705).

If yes in the step S705, then the divided screen number displayed at a predetermined region of the divided screen is selected using the numerical keys of the remote controller (S706).

If it is determined whether the basic setting value of the selected divided screen should be controlled again (S707).

If it is determined that the basic setting value should be controlled again in the step S707, then the basic setting value is controlled again (S708) and then the step S704 is performed again.

If it is determined that the basic setting value should not be controlled again in the step S707, then it is determined whether the screen-division searching function is finished (S709).

If it is determined that the screen-division searching function is not finished in the step S709, then the step S704 is performed again.

If it is determined that the screen-division searching function is finished in the step S709, then the selected divided screen is changed to the full screen (S710).

The current position and the searched result of the image are displayed on the screen (S711).

A detailed searching function is performed using a general searching function for the specific video data (e.g., a recorded image or the like) (S712).

The video apparatus including the screen-division searching function and the method of controlling the same according to the present invention have the following effects.

First, according to the present invention, in a process of searching for any video data, one piece of video data is divided and the divided sections of the video data are simultaneously outputted. Accordingly, a user can search for a desired specific scene as fast as possible.

Second, according to the present invention, in a process of searching for any video data, a desired scene can be rapidly searched without exceedingly increasing a reproduction speed. Accordingly, it is possible to prevent an image cutting phenomenon in an accelerated reproduction process.

In particular, the screen-division searching function according to the present invention have the excellent effect when searching for an image which is not largely changed, such as an image photographed by CCTV cameras which are installed in front entrances of houses.

Other implementations are within the scope of the following claims.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of controlling a display device, the method comprising:
    capturing and obtaining video data via a camera included in the display device;
    storing the video data in a memory;
    separating the video data into a plurality of portions;
    dividing a full screen into a plurality of partial screens, wherein a user sets a total number of the partial screens based on dividing a total size of the video data in unit of bytes; and
    simultaneously reproducing the plurality of portions of the video data on the plurality of partial screens, wherein the simultaneous reproducing includes:
        displaying an image of each of the reproduced plurality of portions of the video data respectively on the plurality of partial screens, and
        displaying time information of each of the plurality of partial screens, the time information indicating time points in which the images are displayed respectively on the plurality of partial screens,
        wherein speeds of reproduction each of the plurality of portions of the video data on the plurality of partial screens are different from each other.

2. The method according to claim 1, wherein different reproduced portions of the video data are different with respect to other portions of the video data.

3. The method according to claim 1, wherein fast searching screens are displayed on the plurality of partial screens.

4. The method according to claim 1, wherein when the speeds of reproducing each of the plurality of portions of the video data on the plurality of partial screens are different from each other, the plurality of portions of the video data are repeatedly reproduced until the reproduction of the video data on the other plurality of partial screens are finished.

5. The method according to claim 1, wherein a first one of the plurality of portions of the video data is reproduced at a first speed, a second one of the plurality of portions of the video data is reproduced at a second speed and a third one of the plurality of portions of the video data is reproduced at a third speed, and
    wherein the second speed is different than the first speed, and the third speed is different than the second speed.

6. A display device comprising:
    a camera configured to capture and obtain video data;
    a memory configured to store the video data;
    a controller configured to:
        divide the video data stored in the memory into a plurality of portions,
        divide a full screen of the display device into a plurality of partial screens, wherein a user sets a total number of the partial screens based on dividing a total size of the video data in unit of bytes, and
        simultaneously reproduce the plurality of portions of the video data; and
    a display unit configured to:
        display an image of each of the reproduced plurality of portions of the video data respectively on the plurality of partial screens, and
        display time information of each of the plurality of partial screens, the time information indicating time points in which the images are displayed respectively on the plurality of partial screens,
        wherein speeds of reproduction each of the plurality of portions of the video data on the plurality of partial screens are different from each other.

7. The display device according to claim 6, wherein size of the divided plurality of partial screens is equal.

8. The display device according to claim 6, wherein fast searching screens are displayed on the plurality of partial screens.

9. The display device according to claim 6, wherein when the speeds of reproducing each of the plurality of portions of the video data on the plurality of partial screens are different from each other, the plurality of portions of the video data are repeatedly reproduced until the reproduction of the video data on the other plurality of partial screens are finished.

10. The display device according to claim 6, wherein the plurality of portions of the video data are equally divided with reference to total time of the video data.

11. The display device according to claim 6, wherein a first one of the plurality of portions of the video data is reproduced at a first speed, a second one of the plurality of portions of the video data is reproduced at a second speed and a third one of the plurality of portions of the video data is reproduced at a third speed, and
    wherein the second speed is different than the first speed, and the third speed is different than the second speed.

* * * * *